US012791825B2

(12) United States Patent

Chen et al.

(10) Patent No.: US 12,791,825 B2

(45) Date of Patent: Nov. 10, 2026

(54) DRIVING MECHANISM

(71) Applicant: Actutek Corporation, Taoyuan City (TW)

(72) Inventors: De Shiang Chen, Taoyuan City (TW); Kun-Shih Lin, Taoyuan City (TW); Wei-Jhe Shen, Taoyuan City (TW); Chen-Hung Chao, Taoyuan City (TW); Sin-Jhong Song, Taoyuan City (TW)

(73) Assignee: ACTUTEK CORPORATION, Taoyuan City (TW)

( * ) Notice: Subject to any disclaimer, the term of this patent is extended or adjusted under 35 U.S.C. 154(b) by 321 days.

(21) Appl. No.: 18/504,488

(22) Filed: Nov. 8, 2023

(65) Prior Publication Data

US 2025/0147268 A1 May 8, 2025

(51) Int. Cl.

*G02B 7/09* (2021.01)
*G03B 5/04* (2021.01)

(52) U.S. Cl.

CPC ................. *G02B 7/09* (2013.01); *G03B 5/04* (2013.01); *G03B 2205/0069* (2013.01)

(58) Field of Classification Search

CPC ... G02B 7/09; G02B 7/08; G03B 5/04; G03B 2205/0069; G03B 3/10
USPC .......................................................... 359/823
See application file for complete search history.

(56) References Cited

U.S. PATENT DOCUMENTS

| | | | | |
|---|---|---|---|---|
| 2007/0096234 | A1 * | 5/2007 | Tanaka | H04N 23/52 257/433 |
| 2018/0335601 | A1 * | 11/2018 | Hu | G03B 5/00 |
| 2019/0018258 | A1 * | 1/2019 | Minamisawa | H04N 23/687 |
| 2019/0174623 | A1 * | 6/2019 | Owaki | H04N 23/52 |
| 2019/0227330 | A1 * | 7/2019 | Hu | F03G 7/0614 |
| 2020/0033559 | A1 * | 1/2020 | Huang | G03B 5/00 |
| 2022/0060610 | A1 * | 2/2022 | Sugiura | G02B 7/04 |
| 2022/0308421 | A1 * | 9/2022 | Hung | G02B 7/04 |
| 2023/0371170 | A1 * | 11/2023 | Shin | H05K 9/0022 |
| 2025/0020972 | A1 * | 1/2025 | Chien | G03B 3/10 |

FOREIGN PATENT DOCUMENTS

CN 215986671 U 3/2022

OTHER PUBLICATIONS

Office Action dated Nov. 5, 2024 issued in corresponding China Patent Application No. 202323016636.9, 2 pages.

* cited by examiner

*Primary Examiner* — William R Alexander
*Assistant Examiner* — Kuei-Jen L Edenfield
(74) *Attorney, Agent, or Firm* — MUNCY, GEISSLER, OLDS & LOWE, P.C.

(57) ABSTRACT

A driving mechanism for moving an optical element is provided. The driving mechanism includes a fixed part, a movable part, and a driving assembly. The movable part is movably connected to the fixed part for holding the optical element. The driving assembly is configured for moving the movable part relative to the fixed part.

24 Claims, 8 Drawing Sheets

DRIVING MECHANISM

BACKGROUND OF THE INVENTION

Field of the Invention

The present invention relates to a driving mechanism, and, in particular, to a driving mechanism for moving an optical element.

Description of the Related Art

In existing dual-lens camera systems, two lens-driving modules are usually arranged close to each other, and as a result, magnetic interference between the magnets of the two lens-driving modules is likely to occur, causing the focus speed and accuracy of the lenses to be adversely affected. Therefore, what is needed is a dual-lens camera system that can prevent magnetic interference between the two lens-driving modules.

BRIEF SUMMARY OF THE INVENTION

An embodiment of the present invention provides a driving mechanism for moving an optical element that has an optical axis. The driving mechanism includes a fixed part, a movable part, and a driving assembly. The movable part is movably connected to the fixed part for holding the optical element. The driving assembly is configured for moving the movable part relative to the fixed part.

In some embodiments, the driving mechanism further includes a reinforcing sheet and a circuit assembly, wherein the fixed part has a plastic housing and a base, the housing forms a slot, the reinforcing sheet is embedded in the housing, and the circuit assembly is affixed in the slot, wherein the reinforcing sheet is exposed to the inner side of the housing and faces the circuit assembly.

In some embodiments, when viewed in a horizontal direction perpendicular to the optical axis, a part of the circuit assembly does not overlap the reinforcing sheet.

In some embodiments, the circuit assembly and the reinforcing sheet are electrically independent from each other.

In some embodiments, the reinforcing sheet has a main body and at least one protrusion extending from the main body, and when viewed along the optical axis, a part of the protrusion does not overlap the main body.

In some embodiments, a part of the housing forms an embedded portion that extends into a through hole of the reinforcing sheet.

In some embodiments, the embedded portion protrudes from the through hole of the reinforcing sheet.

In some embodiments, the embedded portion forms a depressed structure inside the through hole.

In some embodiments, the housing has a sidewall and a protruding structure extends from the sidewall toward the interior of the housing, the slot is formed between the sidewall and the protruding structure, and the reinforcing sheet faces the protruding structure.

In some embodiments, the reinforcing sheet forms a sloped surface embedded in the sidewall.

In some embodiments, the sidewall, the reinforcing sheet, the circuit assembly, and the protruding structure are arranged in a horizontal direction that is perpendicular to the optical axis.

In some embodiments, the driving mechanism further includes a glue disposed in the recess and between the circuit assembly and the reinforcing sheet.

In some embodiments, the protruding structure includes a first portion, a second portion, and a third portion connected between the first and second portions, wherein the third portion forms a depressed structure toward the outer side of the housing.

In some embodiments, the driving mechanism further includes a light-curable glue disposed on the first portion for adhering the circuit assembly to the housing.

In some embodiments, the glue includes thermal glue.

In some embodiments, the movable part has a projecting portion, and the third portion contacts the projecting portion when the movable part is in the limit position, thereby restricting the movable part in the limit position.

In some embodiments, the base has a protruding barrier contacting and restricting the movable part in the limit position.

In some embodiments, the housing has a sidewall and a protruding structure extends from the sidewall toward the interior of the housing, and the slot is formed between the sidewall and the protruding structure, wherein the protruding barrier and the protruding structure at least partially overlap when viewed along the optical axis.

In some embodiments, the protruding barrier has a first segment, a second segment, and a third segment connected between the first and second segments, wherein the third segment forms a depressed structure in the protruding barrier.

In some embodiments, the movable part has a projecting portion, and the third portion contacts the projecting portion when the movable part is in the limit position.

In some embodiments, the distance between the third segment and the movable part is different from the distance between the first segment and the movable part.

In some embodiments, the sidewall, the reinforcing sheet, the circuit assembly, and the protruding barrier are arranged in a horizontal direction that is perpendicular to the optical axis.

In some embodiments, the driving mechanism further includes an electronic element disposed on the circuit assembly and angled relative to the optical axis.

In some embodiments, the driving assembly has a coil and a magnetic element, and the housing forms two columns, wherein the coil is disposed on the movable part, and the magnetic element is disposed between the two columns.

In some embodiments, the driving mechanism further includes an upper spring sheet connecting the movable part to the housing, wherein the upper spring sheet surrounds the columns.

In some embodiments, the magnetic element and the upper spring sheet partially overlap when viewed along the optical axis.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
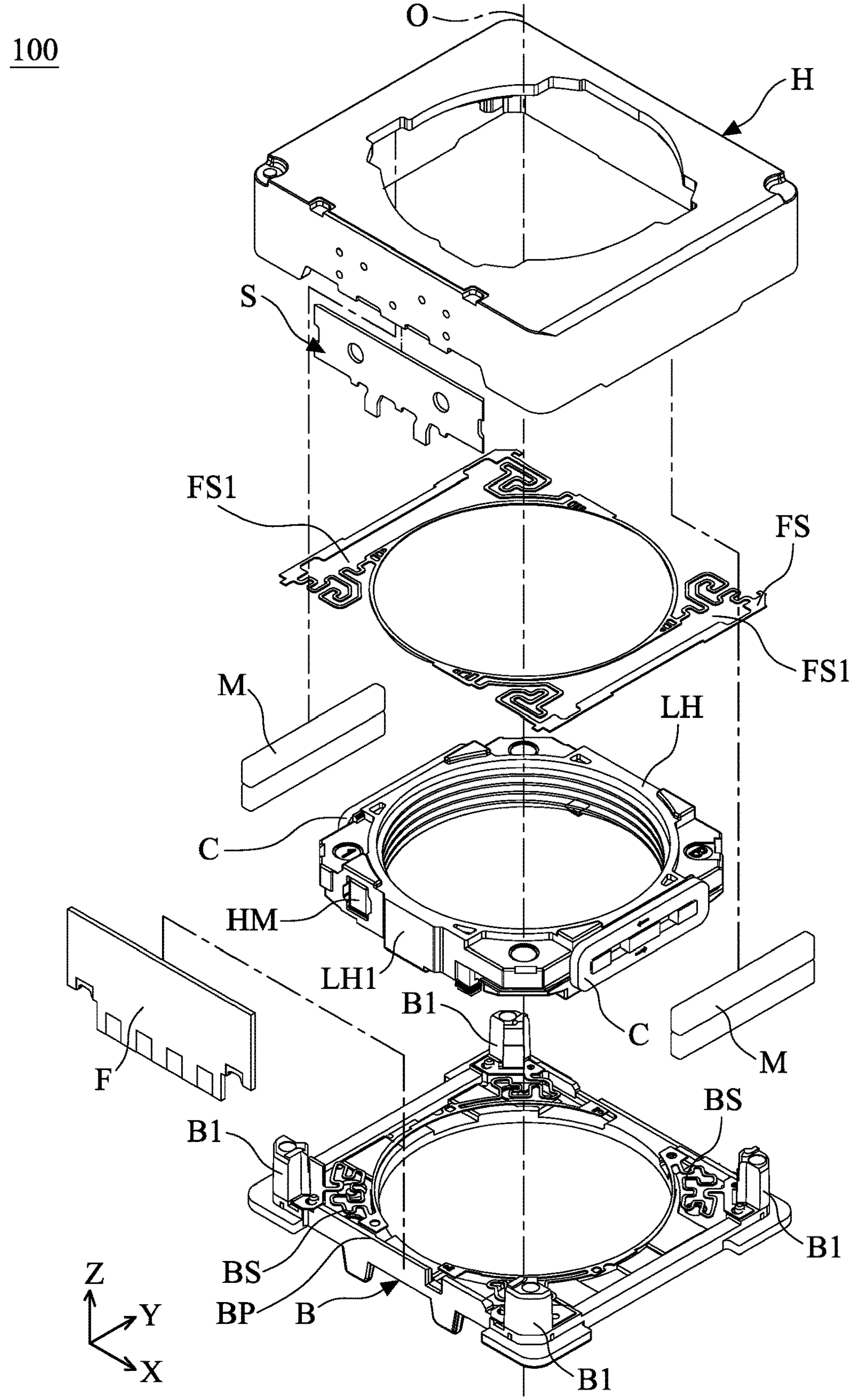
FIG. 1 shows an exploded view of a driving mechanism 100 in accordance with an embodiment of the invention.
Figure 2:
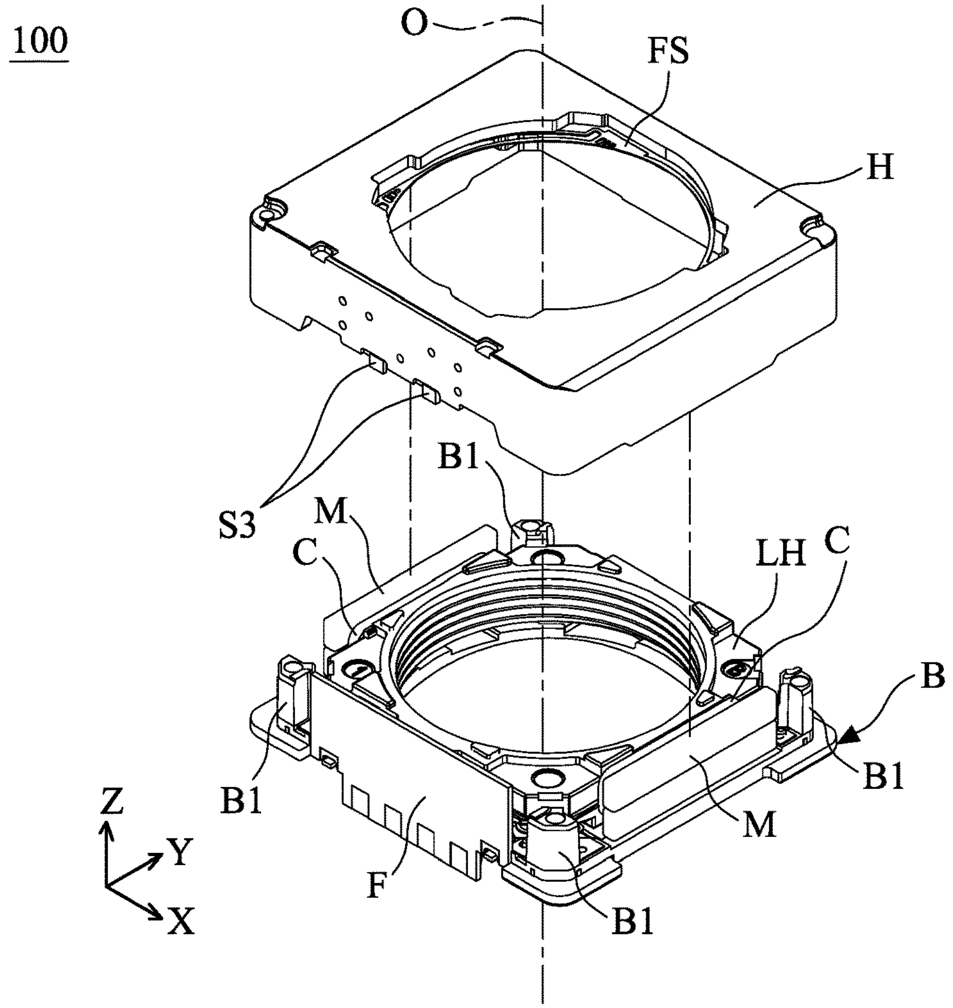
FIG. 2 shows another exploded view of the driving mechanism 100 in FIG. 1.
Figure 3:
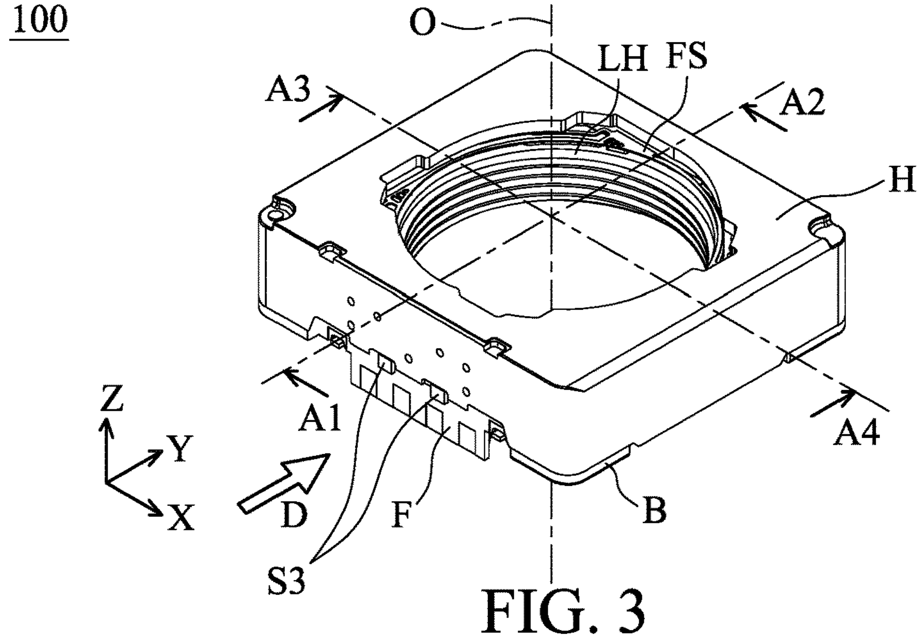
FIG. 3 shows a perspective diagram of the driving mechanism 100 in FIG. 1.

FIG. 1 shows an exploded view of a driving mechanism 100 in accordance with an embodiment of the invention. FIG. 2 shows another exploded view of the driving mechanism 100 in FIG. 1. FIG. 3 shows a perspective diagram of the driving mechanism 100 in FIG. 1.

Referring to FIGS. 1-3, the driving mechanism 100 in this embodiment is a Voice Coil Motor (VCM) which may be disposed in a cell phone or other portable electronic device for driving an optical element (e.g. optical lens) to move, thereby achieving the function of auto-focusing (AF) or Optical Image Stabilization (OIS).

The driving mechanism 100 primarily comprises a plastic housing H, a base B, a circuit assembly F, a holder LH, at least one upper spring sheet FS, at least one lower spring sheet BS, at least one magnetic element M, and at least one coil C. In this embodiment, the housing H has a hollow structure affixed to the base B. Here, the housing H and the base B form a fixed part of the driving mechanism 100. During assembly, four columns B1 extend into the housing H, and the glue can be applied between the columns B1 and the inner surface of the housing H.

Additionally, the holder LH is movably received in the housing H, and an optical element (not shown) is affixed in the holder LH. The holder LH forms a movable part that is movable relative to the fixed part (the housing H and the base B).

The holder LH is connected to the housing H and the base B via the upper and lower spring sheets FS and BS, so that the holder LH can be suspended within the driving mechanism 100. With the configuration as described above, external light can enter the driving mechanism 100 substantially along the optical axis O of the optical element, and light can propagate through the optical element to an image sensor (not shown) below the base B to form a digital image.

It should be noted that two oval-shaped coils C are disposed on opposite sides of the holder LH. Moreover, two magnetic elements M (e.g. magnets) are disposed on the inner sides of the housing H and located corresponding to the coils C. The coils C and the magnetic elements M constitute a driving assembly for impelling the movable part (holder LH) relative to the fixed part (the housing H and the base B) along the optical axis O.

When a current signal is applied to the coils C, an electromagnetic force can be generated by the coils C and the magnets M, so that the holder LH and the optical element received therein can be driven to move relative to the fixed part (the housing H and the base B) along the optical axis O (Z direction). Hence, the function of auto-focusing (AF) or Optical Image Stabilization (OIS) can be achieved.

FIG. 1 further shows a magnet HM is disposed on a side of the movable part LH, and a magnetic field sensor HS is disposed on the circuit assembly F. It should be noted that the magnetic field sensor HS may be a Hall effect sensor, MR sensor, or Fluxgate sensor to detect the position variation of the magnet HM, so that the relative movement between the holder LH and the fixed part (the housing H and the base B) can be determined.

Figure 4:
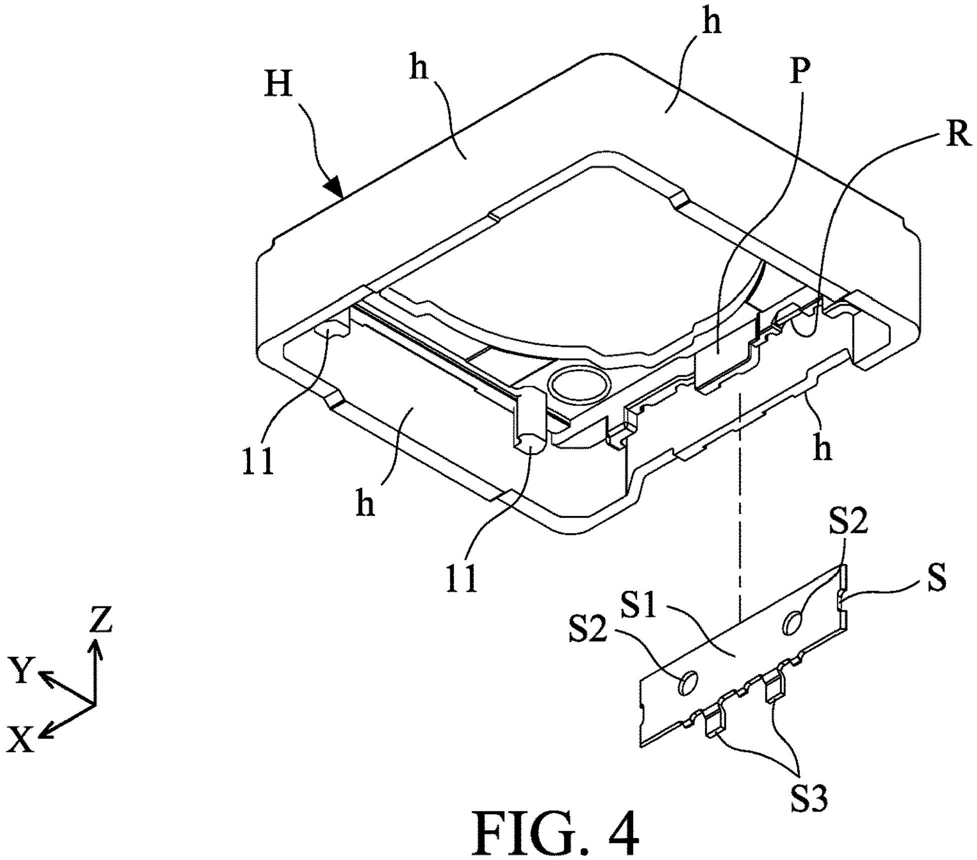
FIG. 4 is an exploded view of the housing H and the reinforcing sheet S.
Figure 5:
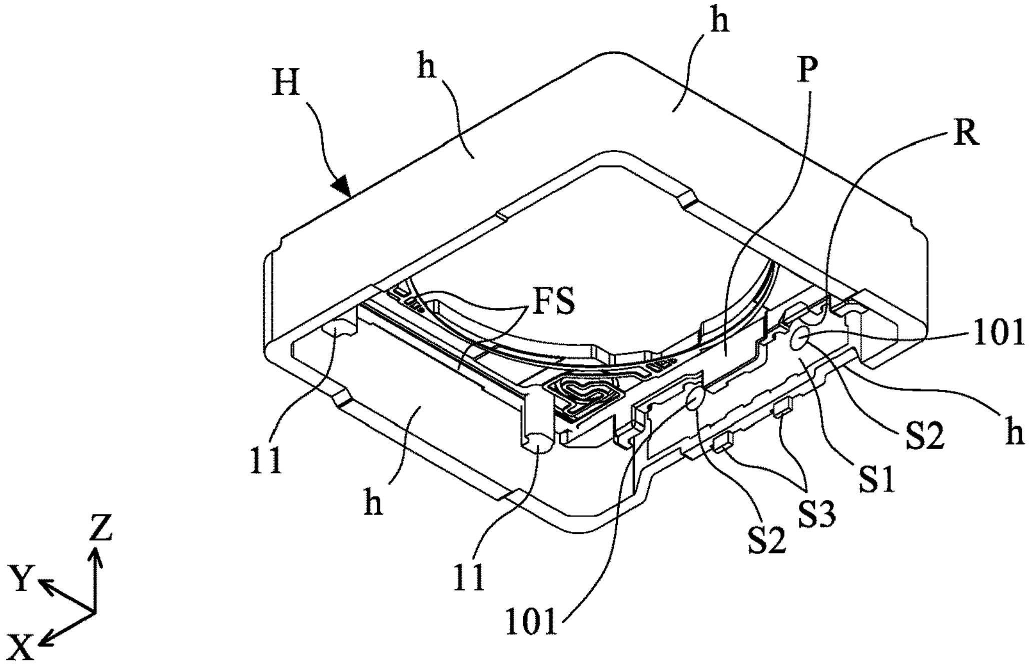
FIG. 5 is a perspective diagram of the housing H, the reinforcing sheet S, and the upper spring sheet FS after assembly.

FIG. 4 is an exploded view of the housing H and the reinforcing sheet S. FIG. 5 is a perspective diagram of the housing H, the reinforcing sheet S, and the upper spring sheet FS after assembly.

Referring to FIGS. 4 and 5, the housing H comprises plastic material, wherein several columns 11 are formed on the inner side of the housing H and extend in the −Z direction. During assembly, the magnetic elements M can be positioned between the adjacent columns 11, thereby preventing horizontal movement of the magnetic elements M relative to the housing H and ensuring normal function of the driving mechanism.

In this embodiment, the upper spring sheet FS is mounted on the inner side of the housing H, and the columns 11 extend through the opening FS1 (FIG. 1) of the upper spring sheet FS.

Additionally, the housing H forms several sidewalls h extend along the optical axis O to the base B. A protruding structure P extends from the sidewall h to the interior of the housing H, and a slot R is formed between the sidewall h and the protruding structure P for receiving the glue and the circuit assembly F.

Specifically, a reinforcing sheet S is embedded in the inner side of the sidewall h. The reinforcing sheet S has low magnetic permeability and is electrically independent from any other circuit element. The reinforcing sheet S has a main body S1, at least one through hole S2 formed on the main body S1, and at least one protrusion S3 extending from the main body S1 in the −Z direction.

In this embodiment, the reinforcing sheet S comprises metal, and it can be integrally formed with the plastic housing H by insert molding. After assembly of the housing H and the reinforcing sheet S, the main body S1 of the reinforcing sheet S is exposed to the inner side of the housing H and faces the protruding structure P. Additionally, a part of the housing H forms an embedded portion 101 that extends into the through hole S2 (FIG. 5), thereby enhancing the connection strength between the housing H and the reinforcing sheet S.

In some embodiments, the embedded portion 101 may slightly protrude from the through hole S2 toward the protruding structure P. However, in some embodiments, the embedded portion 101 may not protrude from the through hole S2, and it forms a depressed structure inside the hole S2, thus increasing adhesion area of the glue between the housing H, the reinforcing sheet S, and the circuit assembly F.

Furthermore, it can be seen in FIG. 5 that the protrusions S3 of the reinforcing sheet S project from the edge of the housing H after assembly. Hence, the glue can be applied from the lateral side of the driving mechanism 100, as the arrow D indicates in FIG. 1, whereby the housing H, the circuit assembly D, the reinforcing sheet S, and the base B can be adhered to each other at the same time. Therefore, reliability and mechanical strength of the driving mechanism 100 can be greatly improved.

Figure 6:
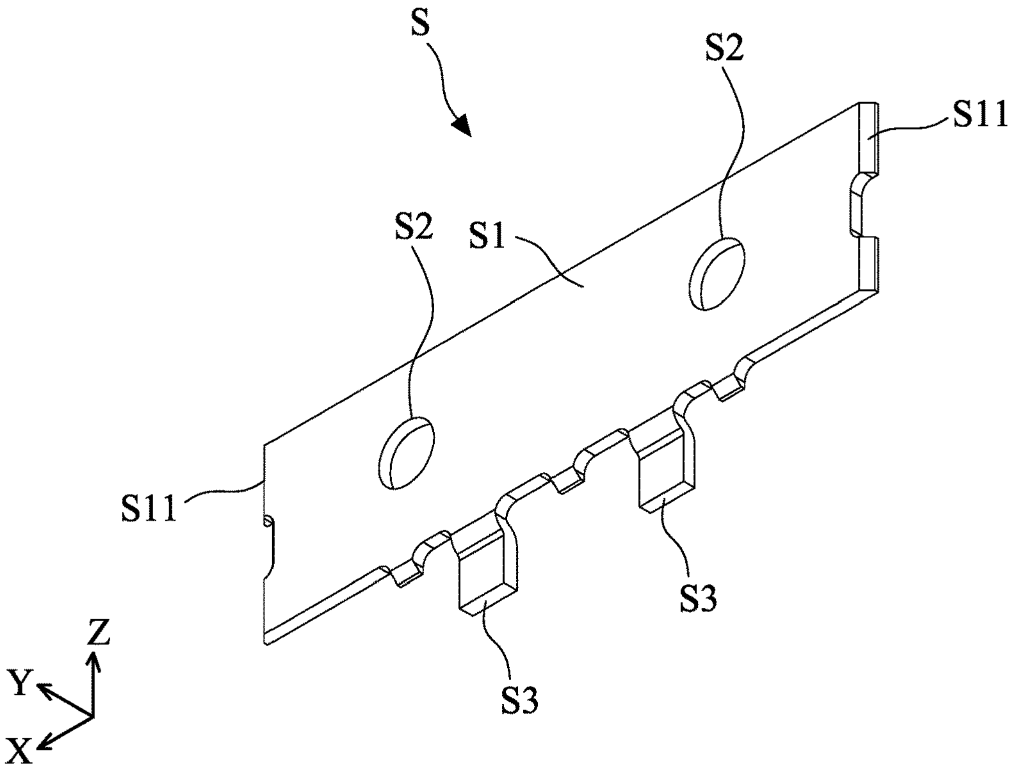
FIG. 6 is a perspective diagram of the reinforcing sheet S.

FIG. 6 is a perspective diagram of the reinforcing sheet S. Referring to FIG. 6, two sloped surfaces S11 are formed on opposite sides of the main body S1 of the reinforcing sheet S. The sloped surfaces S11 are embedded in the sidewall h of the housing H to increase connection strength of the reinforcing sheet S and the housing H.

Here, the protrusions S3 are bent relative to the main body S1 in the horizontal direction (−Y direction). When viewed along the optical axis O (Z direction), a part of the protrusion S3 protrudes from and does not overlap the main body S1.

Figure 7:
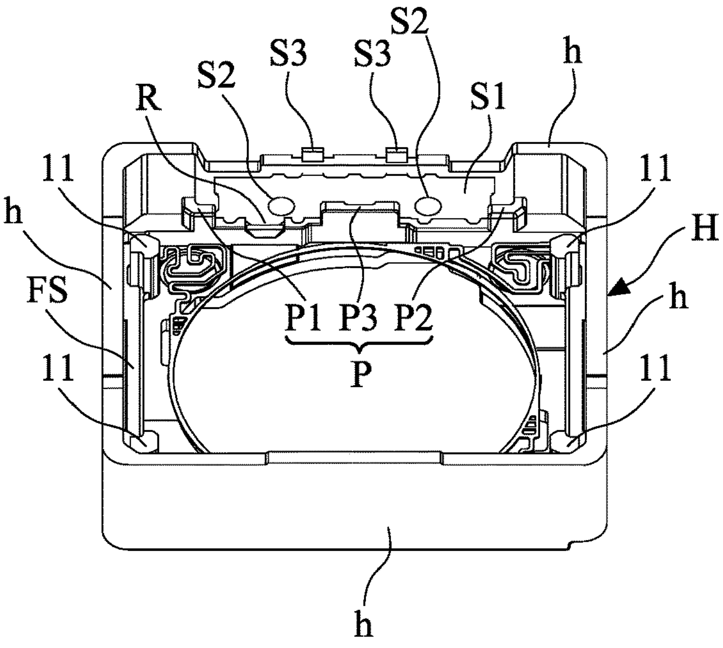
FIG. 7 is another perspective diagram of the housing H, the reinforcing sheet S, and the upper spring sheet FS after assembly.
Figure 8:
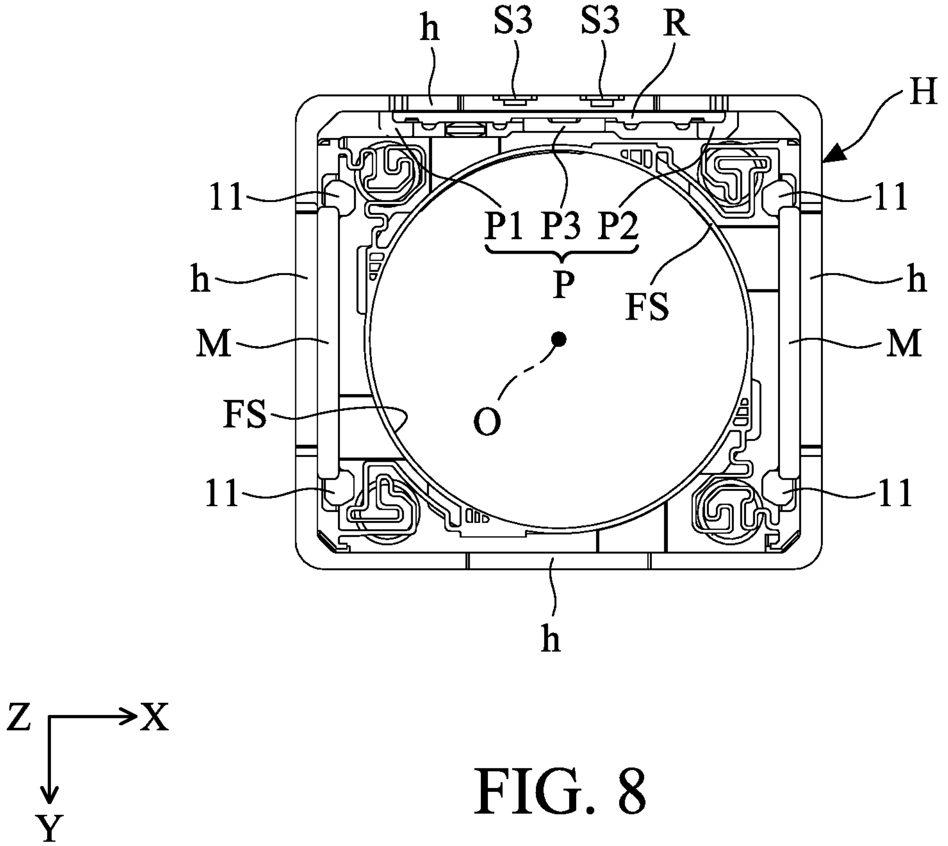
FIG. 8 is a bottom view of the housing H, the reinforcing sheet S, and the upper spring sheet FS after assembly.
Figure 9:
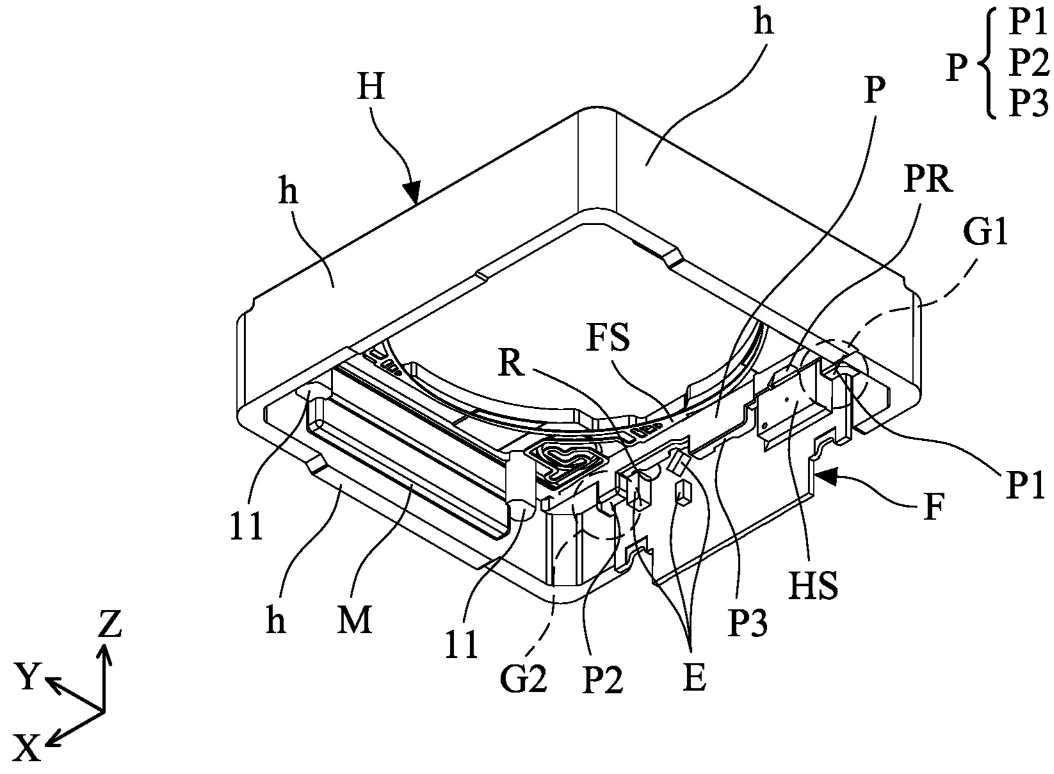
FIG. 9 is a perspective diagram of the housing H, the reinforcing sheet S, the magnetic elements M, and the upper spring sheet FS after assembly.

FIG. 7 is another perspective diagram of the housing H, the reinforcing sheet S, and the upper spring sheet FS after assembly. FIG. 8 is a bottom view of the housing H, the reinforcing sheet S, and the upper spring sheet FS after assembly. FIG. 9 is a perspective diagram of the housing H, the reinforcing sheet S, the magnetic elements M, and the upper spring sheet FS after assembly.

Referring to FIGS. 7-9, the upper spring sheet FS surrounds the columns B1 of the base B, and the magnetic elements M and the upper spring sheet FS partially overlap when viewed along the optical axis O. Moreover, the slot R is formed between the sidewall h and the protruding structure P. The protruding structure P comprises a first portion P1, a second portion P2, and a third portion P3 connected between the first and second portions P1 and P2.

It should be noted that the glue (e.g. thermal glue) can be disposed in the slot R and the space between the circuit assembly F and the reinforcing sheet S during assembly. Therefore, the circuit assembly F can be affixed in the slot R.

To enhance the connection strength of the circuit assembly F and the housing H, light-curable glue (e.g. UV glue) or hybrid UV/heat cure adhesive can be applied to the first and second portions P1 and P2 of the protruding structure P during assembly, as the areas G1 and G2 show in FIG. 9. In this embodiment, the circuit assembly F and the housing H can be previously adhered to each other, and all the components (including the base B) of the driving mechanism 100 can be heated together for thermal curing after they are assembled by thermal glue. Therefore, the stepwise curing of the driving mechanism 100 can be accomplished to enhance the structural reliability.

In some embodiments, light-curable glue or hybrid UV/heat cure adhesive may also be applied to the third portion P3 of the protruding structure P, thus further increasing the connection strength of the circuit assembly F and the housing H.

Moreover, as shown in FIG. 9, the magnetic field sensor HS and several electronic elements E (e.g. capacitors or inductors) are disposed on the circuit assembly F. Two of the electronic elements E at least partially overlap when viewed along the optical axis O (Z direction), and one of the electronic elements E is angled relative to the optical axis O (Z direction). In this configuration, the space inside the housing H can be efficiently utilized, thereby achieving miniaturization of the driving mechanism 100.

When the circuit assembly F is inserted in the slot R, the magnetic field sensor HS on the circuit assembly F is in contact with the edge of the protruding structure P and located adjacent to the cavity PR that is formed on the protruding structure P for receiving the glue. Thus, precise positioning of the circuit assembly F relative to the housing H can be achieved, and tight connection between the housing H and the circuit assembly F can also be accomplished by applying the glue into the cavity PR.

Figure 10:
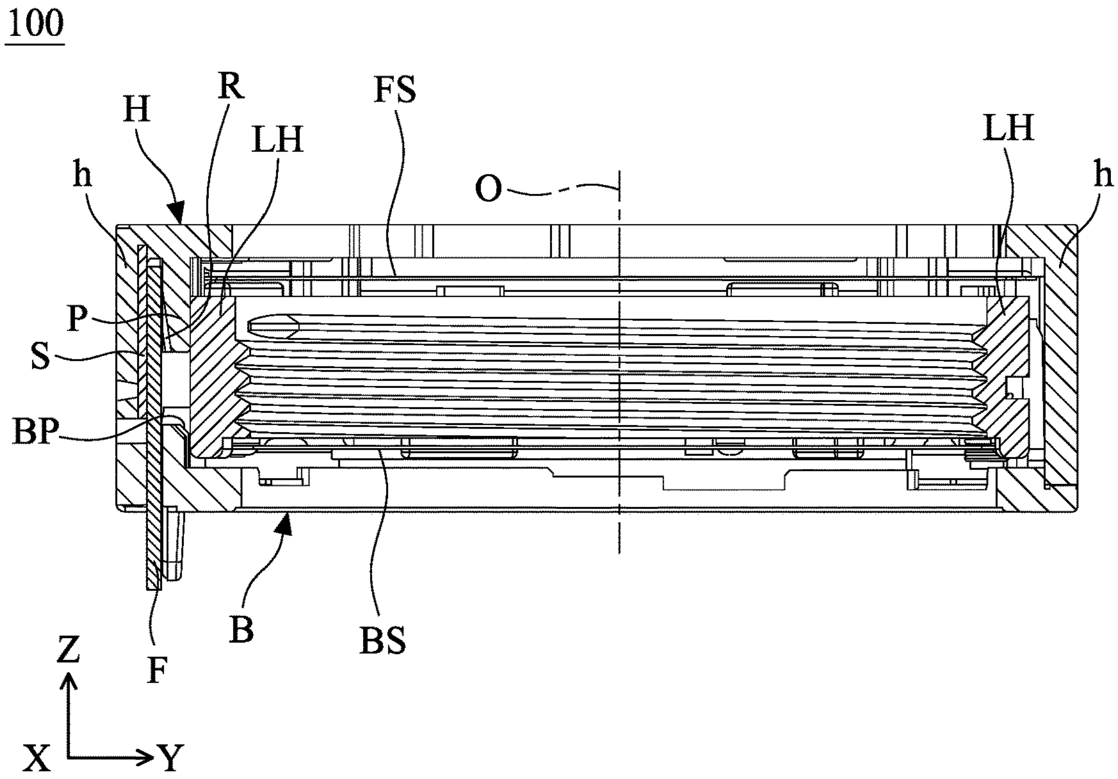
FIG. 10 is a cross-sectional view taken along line A1-A2 in FIG. 3.
Figure 11:
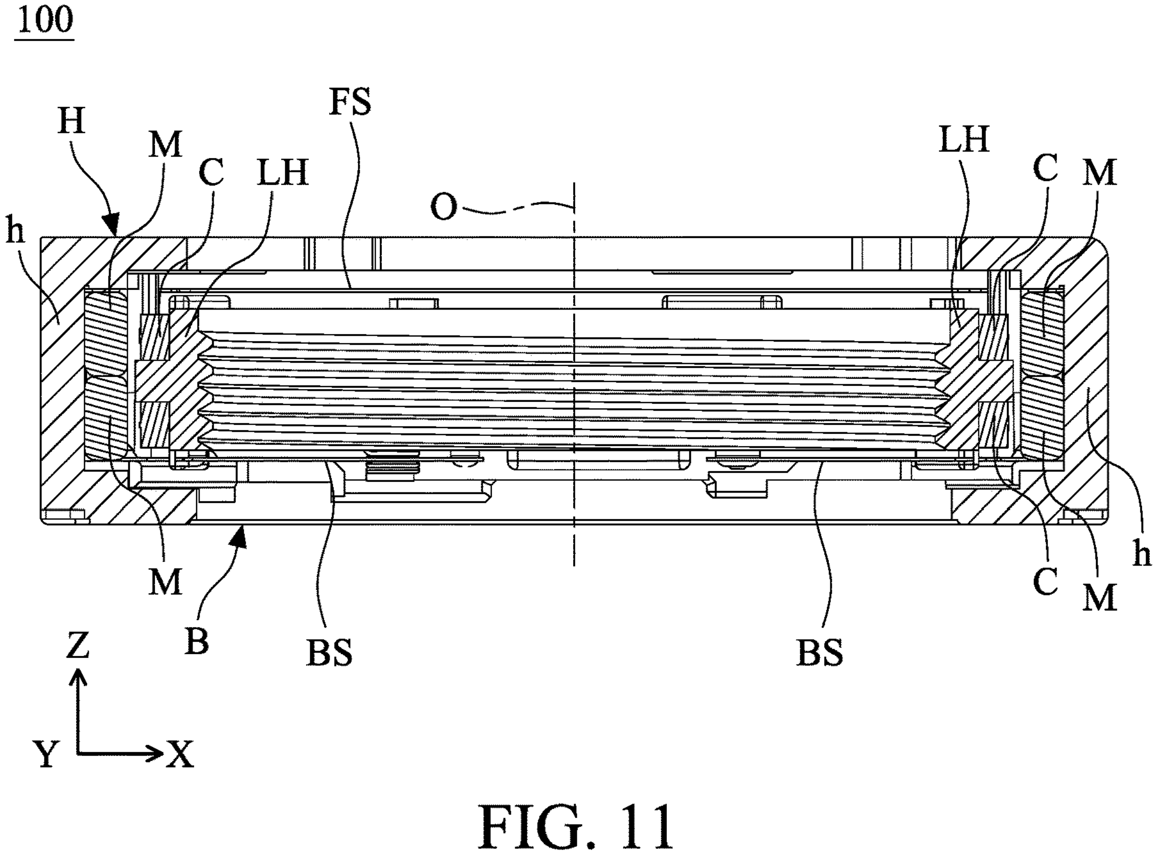
FIG. 11 is a cross-sectional view taken along line A3-A4 in FIG. 3.

FIG. 10 is a cross-sectional view taken along line A1-A2 in FIG. 3. FIG. 11 is a cross-sectional view taken along line A3-A4 in FIG. 3.

Referring to FIGS. 1 and 10, a protruding barrier BP is formed on a side of the base B. When an external force is applied to the driving mechanism 100, the protruding barrier BP and the protruding structure P on the inner side of the housing H can contact and restrict the holder LH, whereby the circuit assembly F can be prevented from being impacted and damaged by the holder LH.

As shown in FIG. 10, the sidewall h, the reinforcing sheet S, the circuit assembly F, and the protruding barrier BP are sequentially arranged in the horizontal direction (Y direction) that is perpendicular to the optical axis O. Additionally, the protruding barrier BP and the protruding structure P at least partially overlap when viewed along the optical axis O.

It can also be seen in FIG. 10 that a part of the circuit assembly F protrudes from the reinforcing sheet S in the −Z direction. That is, the part of the circuit assembly F does not overlap the reinforcing sheet S when viewed in the horizontal direction (Y direction).

In this embodiment, the structural strength of the housing H can be increased by the reinforcing sheet S embedded in the housing H. Moreover, the reinforcing sheet S can also provide a shielding to the circuit assembly F and the magnetic field sensor HS. Therefore, the magnetic field sensor HS can be prevented from being influenced by the magnetic elements outside the driving mechanism 100, whereby precise detection and measurement of the magnetic field sensor HS can be achieved.

As shown in FIG. 11, two coils C are disposed on opposite sides of the holder LH. Two magnetic elements M (e.g.

magnets) are disposed on the inner sides of the housing H and located corresponding to the coils C. When a current signal is applied to the coils C, an electromagnetic force can be generated by the coils C and the magnets M, so that the holder LH and the optical element received therein can be driven to move relative to the fixed part (the housing H and the base B) along the optical axis O (Z direction). Hence, the function of auto-focusing (AF) or Optical Image Stabilization (OIS) can be achieved.

Figure 12:
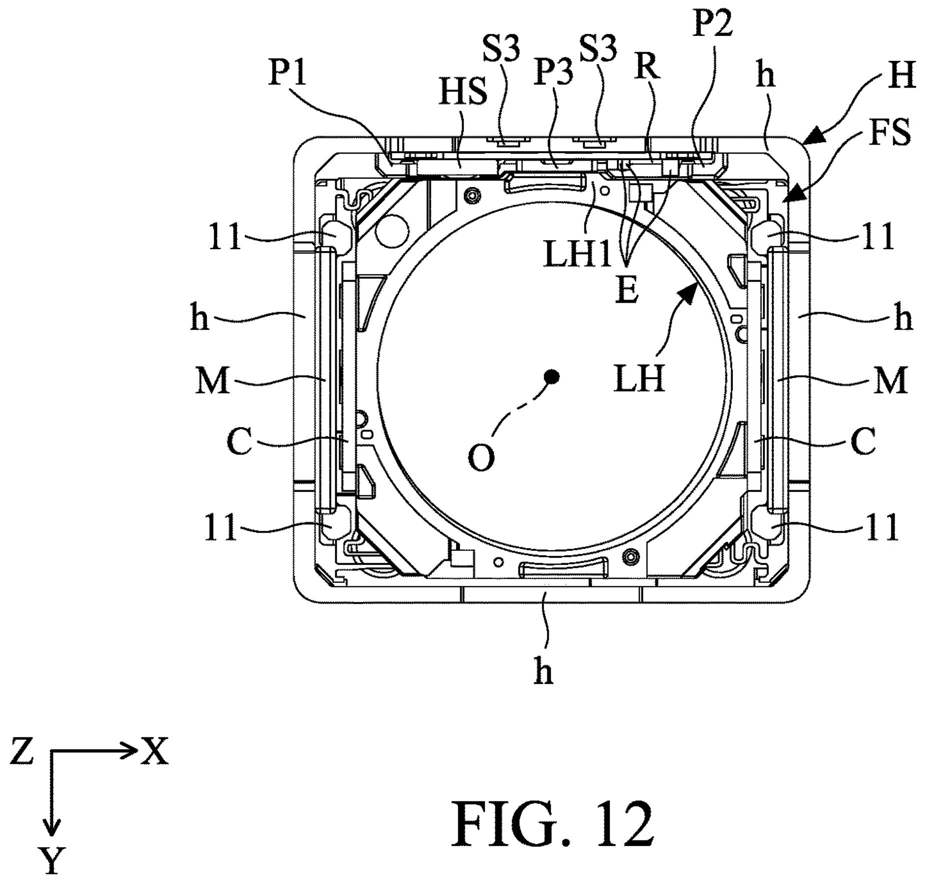
FIG. 12 is a schematic diagram showing the holder LH and the coils C disposed in the housing H
Figure 13:
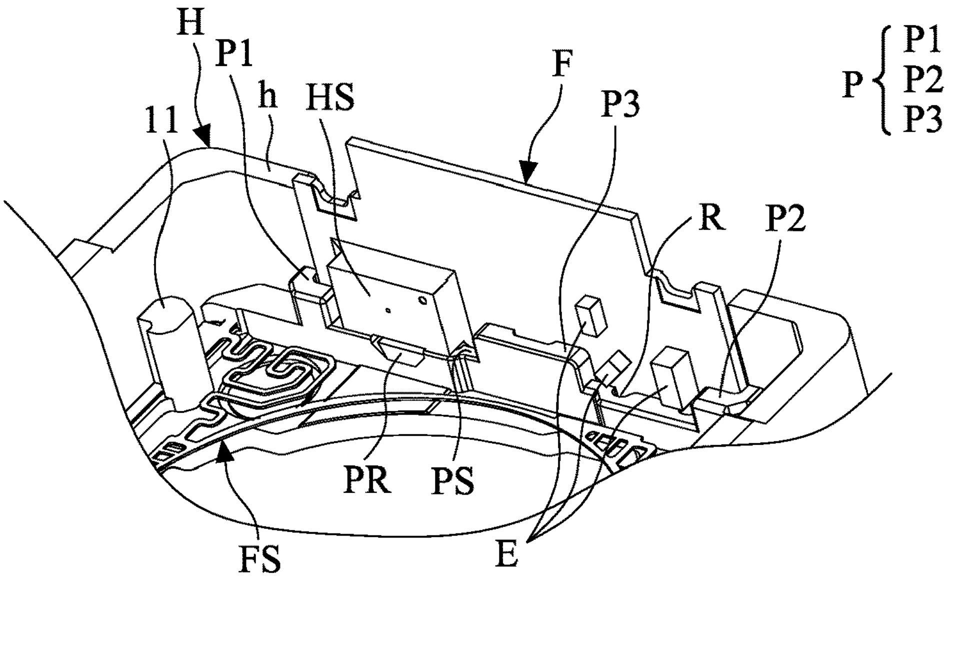
FIG. 13 is a partial enlarged perspective view showing the magnetic field sensor HS in contact with the edge of the protruding structure P.
Figure 14:
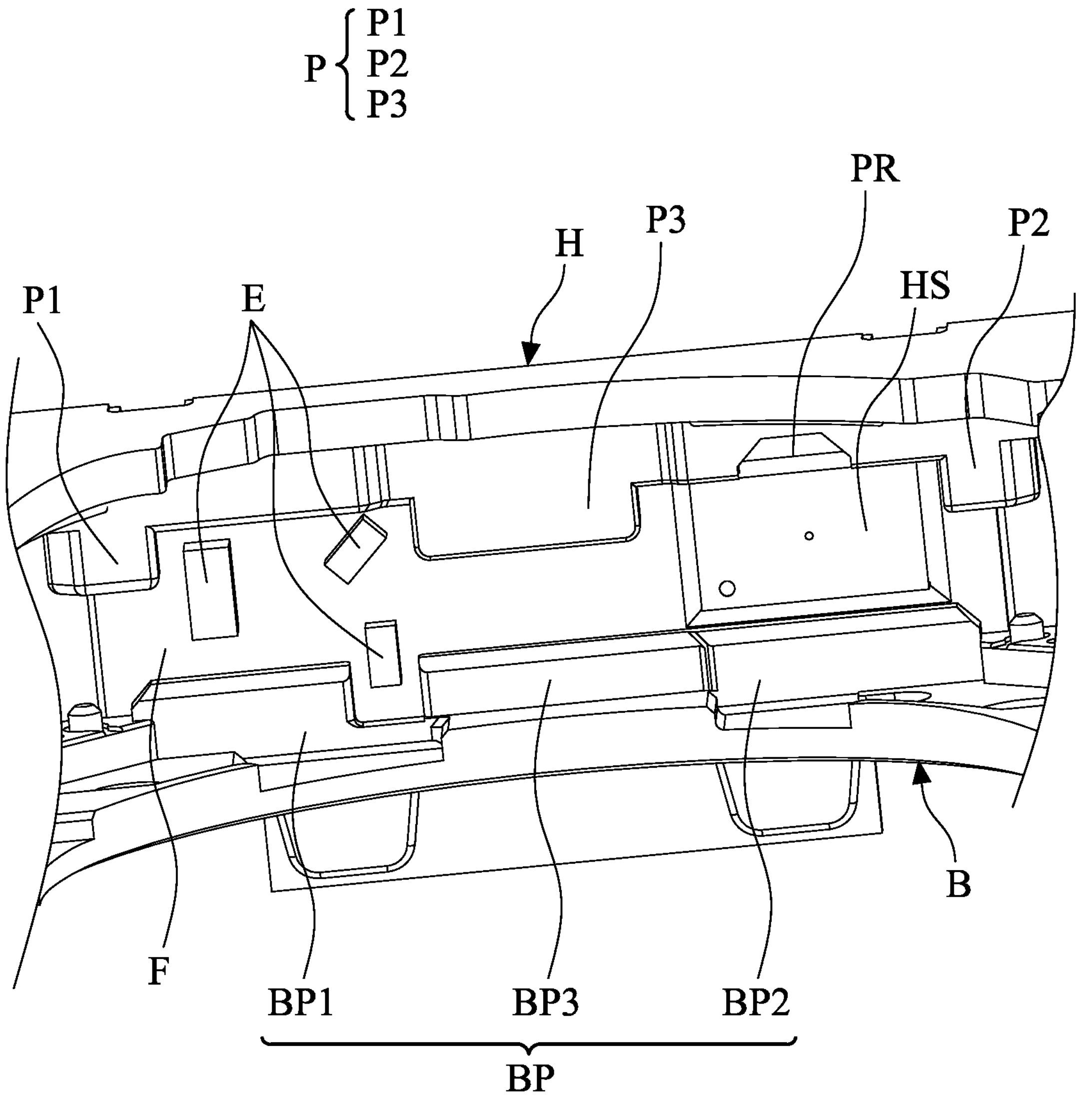
FIG. 14 is schematic diagram showing the protruding barrier BP that has a first segment BP1, a second segment BP2, and a third segment BP3 connected between the first and second segments BP1 and BP2.

FIG. 12 is a schematic diagram showing the holder LH and the coils C disposed in the housing H. FIG. 13 is a partial enlarged perspective view showing the magnetic field sensor HS in contact with the edge of the protruding structure P. FIG. 14 is schematic diagram showing the protruding barrier BP that has a first segment BP1, a second segment BP2, and a third segment BP3 connected between the first and second segments BP1 and BP2.

Referring to FIGS. 12, 13, and 14, two electronic elements E at least partially overlap along the optical axis O (Z direction), and one of the electronic elements E is angled relative to the optical axis O (Z direction). Hence, the space inside the housing H can be efficiently utilized, thereby achieving miniaturization of the driving mechanism 100.

It can also be seen in FIGS. 13, and 14 that the magnetic field sensor HS is in contact with an end surface (edge) of the protruding structure P and located adjacent to the cavity PR that is formed on the protruding structure P for receiving the glue. Thus, precise positioning of the circuit assembly F relative to the housing H can be achieved, and tight connection between the housing H and the circuit assembly F can also be accomplished by applying the glue into the cavity PR.

Specifically, the protruding barrier BP in this embodiment has a first segment BP1, a second segment BP2, and a third segment BP3 connected between the first and second segments BP1 and BP2 (FIG. 14). The third segment BP3 forms a depressed structure between the first and second segments BP1 and BP2, and the depressed structure is depressed toward the outer side of the base B.

When an external force is applied to the driving mechanism 100, the third portion P3 of the protruding structure P and/or the third segment BP3 of the protruding barrier BP can contact the projecting portion LH1 of the holder LH, so as to restrict the holder LH (movable part) in the limit position along the horizontal direction (Y direction). Thus, the circuit assembly F can be prevented from being directly impacted and damaged by the holder LH.

Moreover, the first and second portions P1 and P2 of the protruding structure P and/or the first and second segments BP1 and BP2 of the protruding barrier BP can also be used as a stopper to contact the projecting portion LH1 of the holder LH, whereby the circuit assembly F can also be prevented from being directly impacted and damaged by the holder LH.

In this embodiment, the distance between the third segment BP3 and the holder LH is greater than the distance between the third portion P3 and the holder LH. Additionally, the distance between the third segment BP3 and the holder LH is different from the distance between the first segment BP1 (or second segment BP2) and the holder LH.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification.

As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism for moving an optical element that has an optical axis, the driving mechanism comprising:
- a fixed part, having a plastic housing and a base, wherein the housing forms a slot;
- a movable part, movably connected to the fixed part for holding the optical element;
- a reinforcing sheet, comprising metal and embedded in the housing by insert molding, wherein the reinforcing sheet has a main body and a protrusion connected to the main body, the protrusion extends from an edge of a sidewall of the housing toward the bottom of the driving mechanism, and when viewed along the optical axis, the protrusion does not overlap the main body;
- a circuit assembly, affixed in the slot, wherein the main body is exposed to the inner side of the sidewall of the housing and faces the circuit assembly, the protrusion is exposed to the lower side of the housing and located on the outer side of the circuit assembly, and a gap is formed between the protrusion and the slot;
- a glue, disposed between the circuit assembly and the reinforcing sheet; and
- a driving assembly, configured for moving the movable part relative to the fixed part.

2. The driving mechanism as claimed in claim 1, wherein when viewed in a horizontal direction perpendicular to the optical axis, a part of the circuit assembly does not overlap the reinforcing sheet.

3. The driving mechanism as claimed in claim 1, wherein the circuit assembly and the reinforcing sheet are electrically independent from each other.

4. The driving mechanism as claimed in claim 1, wherein a part of the housing forms an embedded portion that extends into a through hole of the reinforcing sheet.

5. The driving mechanism as claimed in claim 4, wherein the embedded portion protrudes from the through hole of the reinforcing sheet.

6. The driving mechanism as claimed in claim 4, wherein the embedded portion forms a depressed structure inside the through hole.

7. The driving mechanism as claimed in claim 4, wherein the housing has a protruding structure extending from the sidewall toward the interior of the housing, the slot is formed between the sidewall and the protruding structure, and the reinforcing sheet faces the protruding structure.

8. The driving mechanism as claimed in claim 7, wherein the reinforcing sheet forms a sloped surface embedded in the sidewall.

9. The driving mechanism as claimed in claim 7, wherein the sidewall, the reinforcing sheet, the circuit assembly, and the protruding structure are sequentially arranged in a horizontal direction that is perpendicular to the optical axis.

10. The driving mechanism as claimed in claim 7, wherein the glue is disposed in the slot.

11. The driving mechanism as claimed in claim 10, wherein the protruding structure comprises a first portion, a second portion, and a third portion connected between the first and second portions, wherein the third portion forms a depressed structure toward the outer side of the housing.

12. The driving mechanism as claimed in claim 11, further comprising a light-curable glue disposed on the first portion for adhering the circuit assembly to the housing.

13. The driving mechanism as claimed in claim 11, wherein the movable part has a projecting portion, and the third portion contacts the projecting portion when the movable part is in a limit position, thereby restricting the movable part in the limit position.

14. The driving mechanism as claimed in claim 10, wherein the glue comprises thermal glue.

15. The driving mechanism as claimed in claim 1, wherein the base has a protruding barrier contacting and restricting the movable part in a limit position.

16. The driving mechanism as claimed in claim 15, wherein the housing has a protruding structure extending from the sidewall toward the interior of the housing, and the slot is formed between the sidewall and the protruding structure, wherein the protruding barrier and the protruding structure at least partially overlap when viewed along the optical axis.

17. The driving mechanism as claimed in claim 16, wherein the protruding barrier has a first segment, a second segment, and a third segment connected between the first and second segments, wherein the third segment forms a depressed structure in the protruding barrier.

18. The driving mechanism as claimed in claim 17, wherein the movable part has a projecting portion, and the third segment contacts the projecting portion when the movable part is in a limit position.

19. The driving mechanism as claimed in claim 17, wherein the distance between the third segment and the movable part is different from the distance between the first segment and the movable part.

20. The driving mechanism as claimed in claim 15, wherein the sidewall, the reinforcing sheet, the circuit assembly, and the protruding barrier are sequentially arranged in a horizontal direction that is perpendicular to the optical axis.

21. The driving mechanism as claimed in claim 1, further comprising an electronic element disposed on the circuit assembly and angled relative to the optical axis.

22. The driving mechanism as claimed in claim 21, wherein the driving assembly has a coil and a magnetic element, and the housing forms two columns, wherein the coil is disposed on the movable part, and the magnetic element is disposed between the two columns.

23. The driving mechanism as claimed in claim 22, further comprising an upper spring sheet connecting the movable part to the housing, wherein the upper spring sheet surrounds the columns.

24. The driving mechanism as claimed in claim 23, wherein the magnetic element and the upper spring sheet partially overlap when viewed along the optical axis.

* * * * *